United States Patent
Yamazaki et al.

(10) Patent No.: US 7,295,102 B2
(45) Date of Patent: Nov. 13, 2007

(54) PANIC ALARM SYSTEM CONTROLLED BY REMOTE TRANSMITTER

(75) Inventors: Toshihiko Yamazaki, Okazaki (JP); Tohru Hara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 201 days.

(21) Appl. No.: 11/127,119

(22) Filed: May 12, 2005

(65) Prior Publication Data
US 2005/0253705 A1 Nov. 17, 2005

(30) Foreign Application Priority Data
May 17, 2004 (JP) ............... 2004-146781

(51) Int. Cl.
*B60R 25/10* (2006.01)
(52) U.S. Cl. ............. 340/426.16; 340/5.3; 340/426.13; 340/825.72; 340/506; 340/539.13; 340/426.17
(58) Field of Classification Search ................ 340/426.11–426.36, 5.72, 5.3, 430, 527–530, 340/506, 573, 825.72
See application file for complete search history.

(56) References Cited

U.S. PATENT DOCUMENTS

| | | | | |
|---|---|---|---|---|
| 3,537,409 A | * | 11/1970 | Farley, Jr. .................... | 109/19 |
| 3,887,910 A | * | 6/1975 | Jones ......................... | 340/527 |
| 3,964,057 A | * | 6/1976 | Wells ......................... | 340/304 |
| 4,232,308 A | | 11/1980 | Lee et al. | |
| 4,887,064 A | * | 12/1989 | Drori et al. ................ | 340/5.23 |
| 5,543,776 A | * | 8/1996 | L'Esperance et al. .. | 340/426.25 |
| 5,608,272 A | * | 3/1997 | Tanguay ..................... | 307/10.2 |
| 5,648,764 A | * | 7/1997 | Nose et al. .................. | 340/5.3 |
| 5,663,704 A | * | 9/1997 | Allen et al. ............ | 340/426.25 |
| 5,729,191 A | * | 3/1998 | Allen et al. ............ | 340/426.17 |
| 6,420,967 B1 | * | 7/2002 | Ghabra et al. ............. | 340/447 |
| 6,443,604 B1 | * | 9/2002 | Rudenberg .................. | 362/488 |
| 6,703,919 B2 | * | 3/2004 | Baset ......................... | 340/5.72 |
| 7,064,667 B2 | * | 6/2006 | Sosna ....................... | 340/568.7 |
| 7,154,398 B2 | * | 12/2006 | Chen et al. .............. | 340/573.1 |

\* cited by examiner

*Primary Examiner*—Jeffery Hofsass
*Assistant Examiner*—Hoi C. Lau
(74) *Attorney, Agent, or Firm*—Birch, Stewart, Kolasch & Birch, LLP

(57) ABSTRACT

When an alarm switch of a transmitter is given a long press carried out for one or more seconds in a timer-reset condition, a first alarm reversal signal is transmitted simultaneously with the setting (starting) of the timer. If the alarm switch is pressed within the set time of the timer regardless of a press time period, a second alarm reversal signal is transmitted, and the timer is reset. On a receiver side, the activation and deactivation of the alarm is alternately performed upon receipt of each alarm reversal signal.

10 Claims, 4 Drawing Sheets

PANIC ALARM SYSTEM CONTROLLED BY REMOTE TRANSMITTER

CROSS-REFERENCE TO RELATED APPLICATIONS

This Nonprovisional application claims priority under 35 U.S.C. §119(a) on Patent Application No. 2004-146781 filed in Japan on May 17, 2004, the entire contents of which are hereby incorporated by reference.

BACKGROUND OF THE INVENTION

1. Field of the Invention

The present invention relates to an alarm system, and more specifically to an alarm system capable of performing alarm action according to the operation of a transmitter.

2. Description of the Related Art

As one of vehicle security systems, a vehicle alarm system that causes a horn and headlights to perform intermittent working (hereinafter referred to as alarm action) by using a receiver installed in the vehicle in response to the operation of a transmitter at hand has been proposed. In one of vehicle alarm systems of this type, an alarm reversal signal is transmitted from the transmitter every time a switch of the transmitter is operated, and the receiver installed in the vehicle alternately activates and deactivates the alarm action upon receipt of each alarm reversal signal. For example, the alarm system is used when the driver of a vehicle sees a suspicious character near the vehicle. In such a case, the driver makes the vehicle activate the alarm action by operating the transmitter at a distance from the vehicle and thus scares the suspicious character away, to thereby prevent the theft of the vehicle and the like.

In the above-mentioned vehicle alarm system, however, the activation and deactivation of alarm action are controlled by operation of a common switch, so that the operator who operates the switch cannot recognize the switching status (activation or deactivation) of alarm action without thinking on the basis of switch operation, and is liable to carry out wrong operation. For example, there is the fear that the wrong operation delays the deactivation of alarm action, which annoys the people around.

Given this factor, U.S. Pat. No. 4,232,308 proposes a vehicle alarm system in which different operation modes of a switch are provided in order to distinguish between the activation and deactivation of alarm action. In this vehicle alarm system, an alarm-ON signal is transmitted from the transmitter when the switch is pressed for a relatively long period of time, and the receiver that receives this alarm-ON signal activates alarm action. If the switch is pressed for a relatively short period of time, an alarm-OFF signal is transmitted from the transmitter, and the receiver that receives this alarm-OFF signal deactivates the alarm action.

Compared to the former vehicle alarm system that transmits and receives a single alarm reversal signal, the latter requires two different kinds of signals, namely alarm-ON and alarm-OFF signals. Consequently, for example, in case that a vehicle in which the former vehicle alarm system is installed is remodeled to be equipped with the latter, this requires not only the change of specification of the transmitter but also of the receiver provided to the vehicle, and more specifically for example, the change of hardware configuration of the receiver, the change of software, and the like. As a result, there causes the problem that preparation and development costs for specification change are considerably increased.

SUMMARY OF THE INVENTION

An object of the present invention is to provide an alarm system capable of preventing wrong operation and changing a specification at low cost by changing only a transmitter side without a change in a receiver side.

To achieve the above object, the alarm system of the present invention receives, by means of a receiver, a signal transmitted from a transmitter in accordance with the operation of an operation member, and activates or deactivates an alarm in response to the received signal. The alarm system comprises a transmission controller disposed on the transmitter side for transmitting an Activate signal predetermined as an Alarm-ON command to the receiver when the operation member is operated in a first operation mode in an initial condition and for transmitting a Deactivate signal predetermined as an Alarm-OFF command to the receiver when the operation member is operated in a second operation mode before a prescribed time period expires after the transmission of the Activate signal, the transmission controller returning to the initial condition after sending the Deactivate signal; and a reception controller disposed on the receiver side for activating an alarm upon receipt of the Activate signal and for deactivating the alarm upon receipt of the Deactivate signal when the alarm is ON.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

An embodiment in which the present invention is embodied in a vehicle alarm system will be described below.

Figure 1:
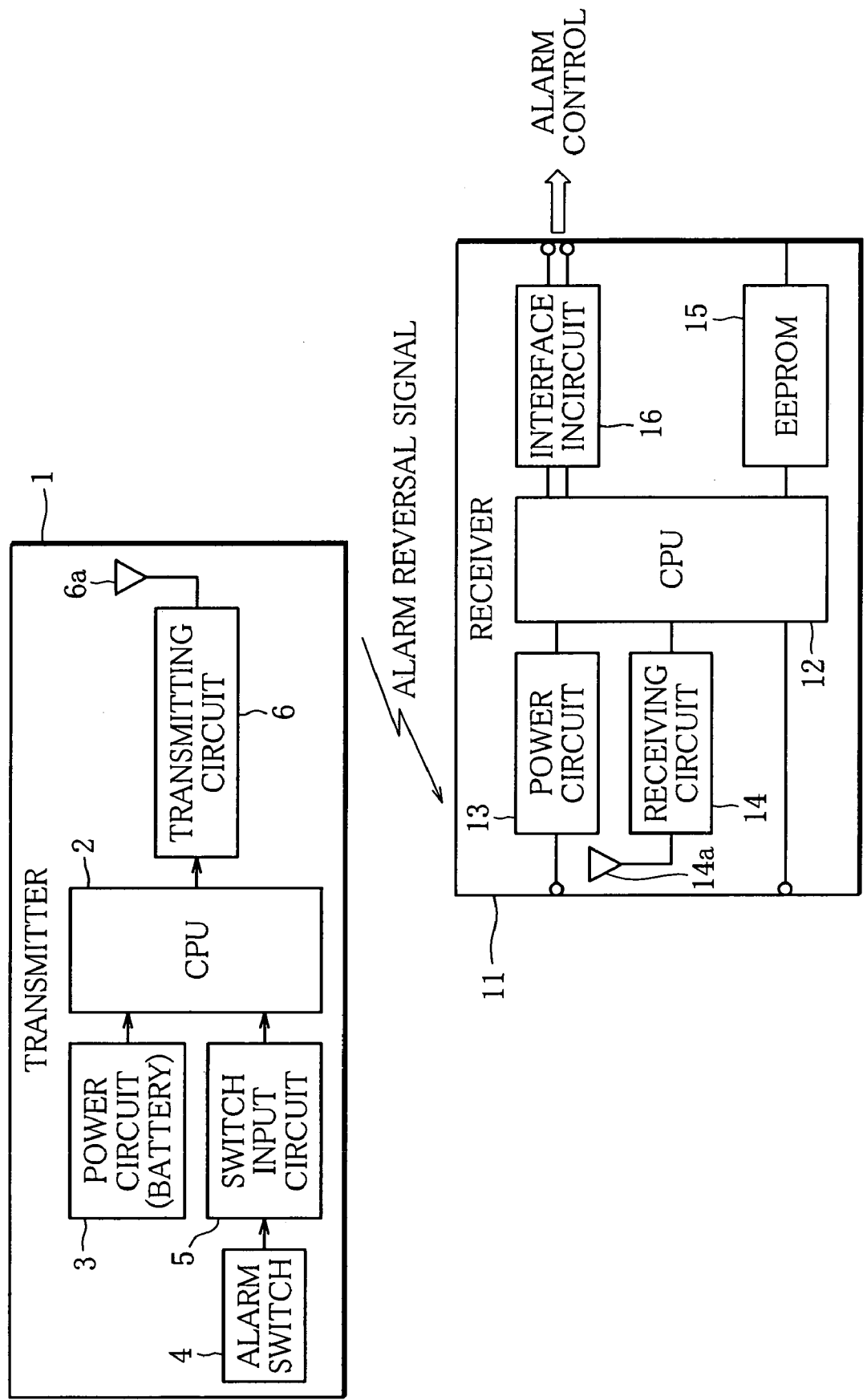
FIG. 1 is a view showing an entire construction of a vehicle alarm system according to an embodiment of the present invention.

FIG. 1 is a view showing an entire construction of the vehicle alarm system according to the embodiment. The vehicle alarm system is comprised of a transmitter 1 carried by a driver of a vehicle and a receiver 11 installed in the vehicle. The transmitter 1 is a portable radio transmitter and is formed of a CPU (central processing unit) 2, which is the main device of the transmitter 1, serving as a transmission controller, a power circuit 3 having a battery built-in, an alarm switch 4 serving as an operation member, a switch input circuit 5, and a transmitting circuit 6 provided with an antenna 6a. The CPU 2 is activated upon supply of battery power from the power circuit 3, and an operation condition of the alarm switch 4 is inputted to the CPU 2 via the switch input circuit 5. In response to the operation condition of the alarm switch 4, the CPU 2 transmits an alarm reversal signal as a radio wave signal via the transmitting circuit 6.

The receiver 11 is formed of a CPU 12, which is the main device of the receiver 11, serving as a reception controller, a power circuit 13 connected to an in-vehicle battery, not shown, a receiving circuit 14 provided with an antenna 14a, EEPROM (Electrically Erasable and Programmable Read Only Memory) 15 used for storage of a control program for activating the CPU 12 and the like, and an interface circuit 16 connected to a vehicle horn and headlights, both not shown. The CPU 12 is activated upon supply of the in-vehicle battery power from the power circuit 13, and the alarm reversal signal transmitted from the transmitter 1 is inputted to the CPU 12 via the receiving circuit 14. In response to the received alarm reversal signal, the CPU 12 implements alarm control (alarm action) that intermittently activates the horn and the headlights via the interface circuit 16.

The alarm system according to the embodiment has a keyless entry function, in which the receiver 11 locks or unlocks a door lock device of each vehicle door in response to a Door-Lock signal or a Door-Unlock signal transmitted from the transmitter 1 through the operation carried out by the operator. The keyless entry function itself is known, so that explanations thereof will be omitted. A process concerning an alarm function from the transmission of the alarm reversal signal performed by the transmitter 1 to the alarm control implemented by the receiver 11 will be described below in detail.

Figure 2:
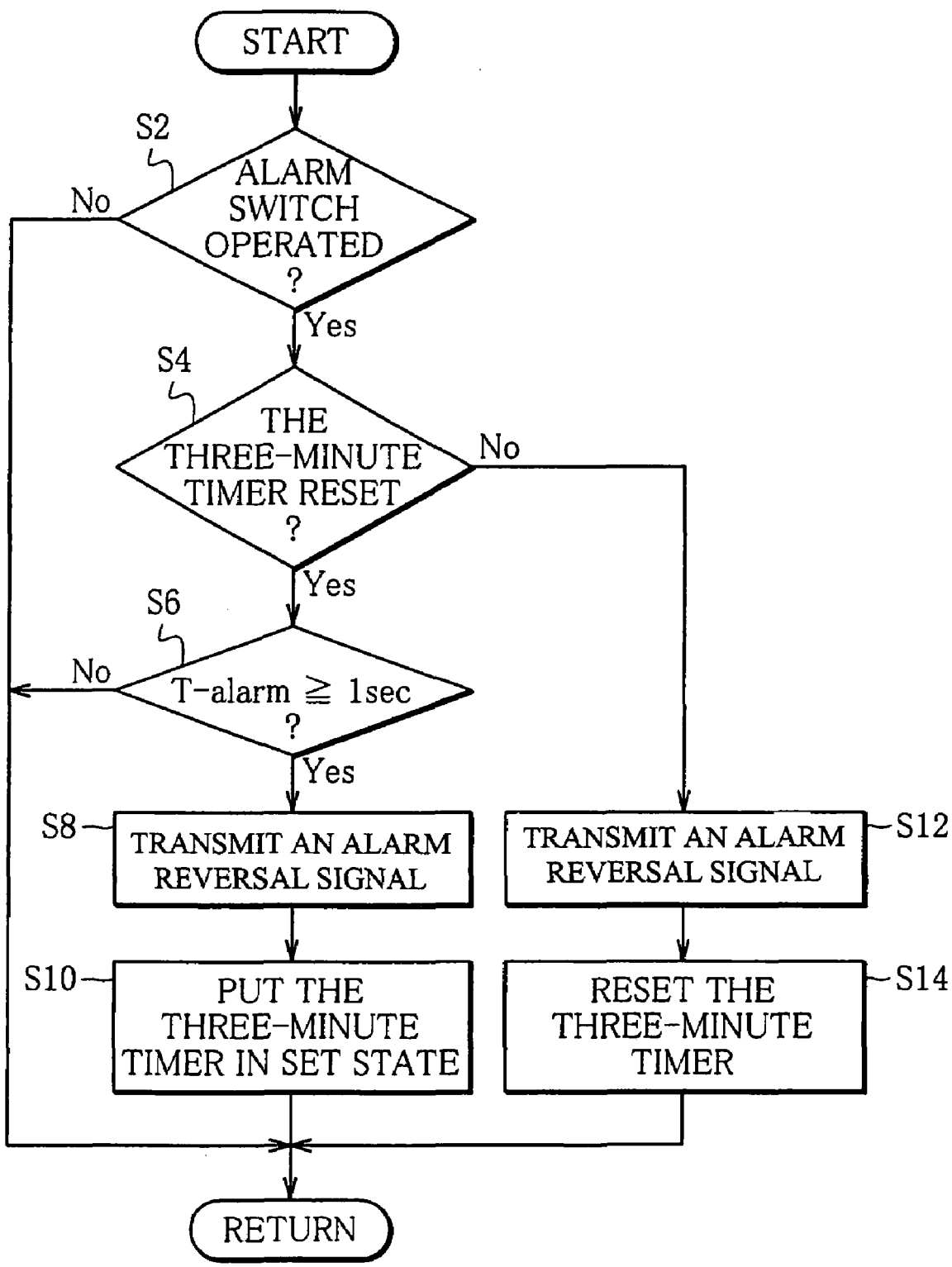
FIG. 2 is a flowchart showing a transmission routine of an alarm reversal signal, which is implemented by a CPU located on a transmitter side.

FIG. 2 is a flowchart showing a transmission routine of the alarm reversal signal, which is implemented by the CPU 2 of the transmitter 1. The CPU 2 carries out the routine at prescribed control intervals.

For the sake of convenience, the following explanation will be given on the assumption that the CPU 2 is in an initial condition where a three-minute timer mentioned below is reset. In Step S2, the CPU 2 determines whether the alarm switch 4 is pressed or not through the switch input circuit 5. If the determination is NO, the routine in this control period is terminated. When the determination is YES, the process advances to Step S4. In Step S4, it is determined whether the three-minute timer is reset. Since the three-minute timer is reset as stated, the determination will be YES, and the process proceeds to Step S6. In Step S6, it is determined whether a press time period T-alarm of the alarm switch 4 is one or more seconds (hereinafter such a press mode will be referred to as a long press). If the determination is NO, the routine in this control period is terminated.

Figure 3:
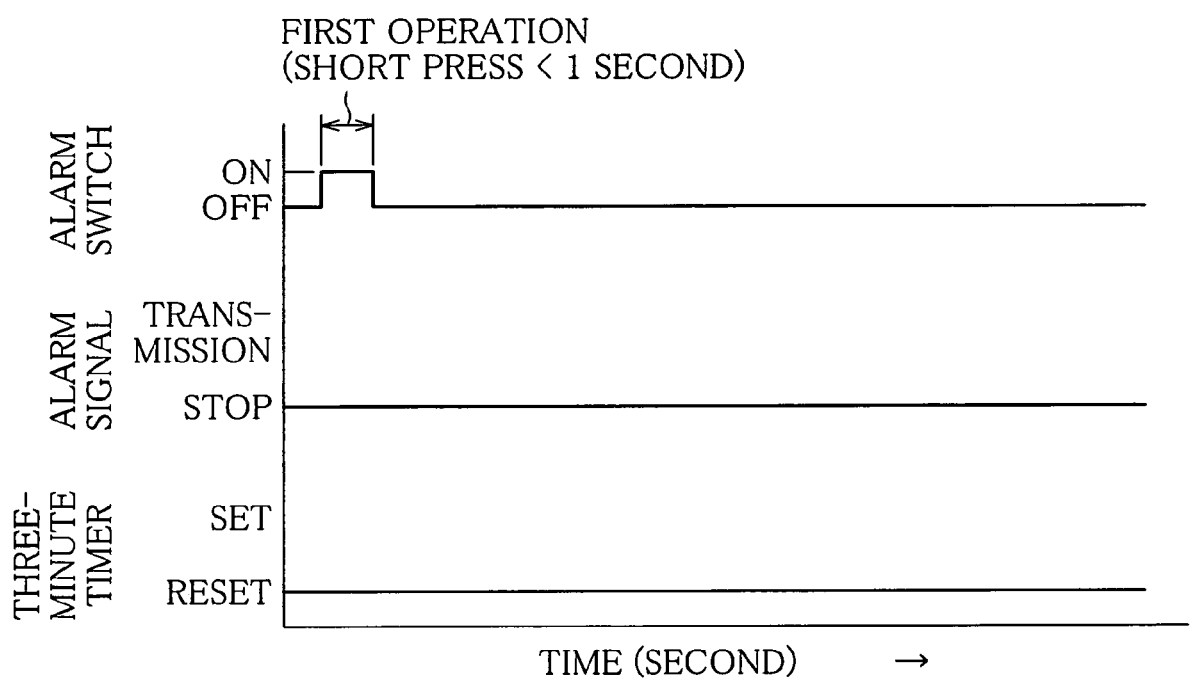
FIG. 3 is a time chart showing the case where the alarm reversal signal is not transmitted as a result of a short period press of an alarm switch in an initial condition of the alarm system.

As shown in a time chart of FIG. 3, if the press of the switch 4 is not a long press (hereinafter the press mode performed for less than one second will be referred to as a short press), the CPU 2 does not implement a transmission process of the alarm reversal signal, even though the alarm switch 4 is pressed in the initial condition.

If the determination of Step S6 is YES due to the press of the alarm switch 4 which is performed for one or more seconds, the process advances to Step S8, and the CPU 2 transmits the alarm reversal signal via the transmitting circuit 6 over a prescribed period of time. In a subsequent Step S10, the three-minute timer is put in a set state (the timer is started), and the routine in this control period is terminated.

Thereafter, the CPU 2 remains on standby while repeating the process of Step S2 until the alarm switch 4 is pressed again. When the alarm switch 4 is pressed, and thus the determination of Step S2 is YES, the process proceeds to Step S4. Since the three-minute timer is in the set state as mentioned, the determination of Step S4 is NO, and the process advances to Step S12 where the CPU 2 transmits the alarm reversal signal over a prescribed period of time. In a subsequent Step S14, the three-timer is reset, thus terminating the routine in this control period.

Figure 4:
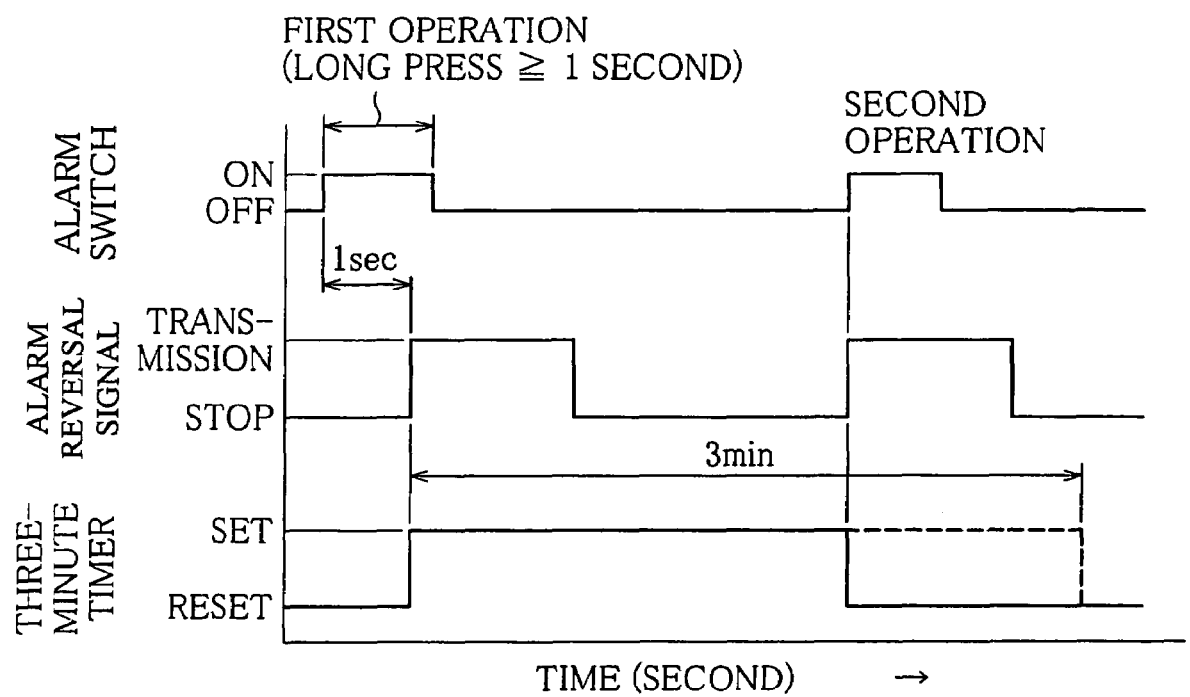
FIG. 4 is a time chart showing the case where a first and a second press of the alarm switch are normally performed in the initial condition of the alarm system, and the alarm reversal signal responsive to each press is transmitted.

Consequently, as shown in a time chart of FIG. 4, in case that the alarm switch 4 is given a long press in the initial condition of the transmitter, upon a lapse of one second that is a threshold value of the press time period T-alarm, a first alarm reversal signal is transmitted, and the three-minute timer is put in the set state at the same time. If the alarm switch 4 is pressed again while the three-minute timer is in the set state (within three minutes), a second alarm reversal signal is transmitted, and the three-minute timer is reset to return to the initial condition.

If three minutes elapse without pressing the alarm switch 4 again after the transmission of the first alarm reversal signal, the three-minute timer is reset to return to the initial condition as shown by a dashed line in FIG. 4. Therefore, even if the alarm switch 4 is pressed thereafter, the alarm reversal signal is not transmitted unless the press is a long press.

The CPU 12 of the receiver 11 receives the alarm reversal signal, which is transmitted from the transmitter 1, via the receiving circuit 14. Every time receiving the alarm reversal signal, the CPU 12 alternately activates and deactivates alarm control. Accordingly, as shown in FIG. 4, the CPU 12 activates the alarm control when receiving the first alarm reversal signal. When receiving the second alarm reversal signal later, the CPU 12 deactivates the alarm control. Duration of the alarm control is limited to three minutes. If the second alarm reversal signal is not received after the alarm control is activated upon receipt of the first alarm reversal signal, the alarm control is automatically deactivated after being continued for three minutes.

Although in the above embodiment, the horn and the headlights are intermittently activated as alarm control, the form of the alarm control is not limited to this. For example, it is possible to intermittently activate the horn only.

As described, the transmitter 11 transmits the first alarm reversal signal in the initial condition where the three-minute timer is reset under the conditions of a long press of the alarm switch 4. Thereafter, if the alarm switch 4 is pressed again in the time period where the three-minute timer is in a set state, which corresponds to a maximum duration of the alarm control, the transmitter 11 transmits the second alarm reversal signal. The first press of the alarm switch 4 is limited to a long press given for one or more seconds, whereas there is no limit in respect of the second press of the alarm switch 4. Therefore, it is possible to use an operation mode for the second press, such as a short press given for, for example, less than 0.5 second which is sharply distinguished from a long press.

Since the press mode of the first press corresponding to the activation of the alarm and that of the second press corresponding to the deactivation of the alarm control are different, the driver (an operator of the alarm switch 4) can recognize a switching status (activation or deactivation) of the alarm control of the receiver 11, without thinking, on the basis of the press mode of the alarm switch 4, which he or she carried out in person. This makes it possible to prevent wrong operation of the alarm switch 4. For example, it is possible to avoid trouble such as annoying the people around with a loud honk, attributable to the delay of the deactivation of the alarm control due to wrong operation.

As a result of the press of the alarm switch 4, a single kind of alarm reversal signal is transmitted from the transmitter 1 with respect to each press. For this reason, it is not required that the receiver 11 activate or deactivate the alarm control in response to a different signal from the transmitter 1 as in the latter vehicle alarm system described in the Related Art. The alarm control can be performed according to the driver's (the operator's) intention if only the receiver 11 alternately activates and deactivates the alarm control every time receiving the alarm reversal signal.

With the present invention, for example, in case that a vehicle equipped with the former vehicle alarm system (alarm system that alternately activates and deactivates the alarm action on the receiver side every time the alarm reversal signal is transmitted from the transmitter) described in the Related Art can be improved at the time of model change by changing the specification of the transmitter 1 only, without change of the specification of the receiver 11. As a consequence, preparation and development costs for specification change can be greatly reduced.

Counting time of the three-minute timer is set on the transmitter 1 side correspondingly to the maximum duration (three minutes) of the alarm control that is set on the receiver 11 side. Therefore, the driver (the operator) can deactivate the alarm control at will by pressing the alarm switch 4 in a time period between the activation and the automatic deactivation of the alarm control. In case that the alarm switch 4 is not pressed while the three-minute timer is in a set state (counting), the three-minute timer is reset on the transmitter 1 side to return to the initial condition simultaneously with the automatic deactivation of the alarm control which is implemented on the receiver 11 side. For example, if the alarm control is deactivated before a suspicious character is driven away from the vehicle, the driver (the operator) immediately can reactivates the alarm control by giving the alarm switch 4 a long press again. Consequently, the alarm action that fulfils the driver's (the operator's) intentions is achieved, which provides the driver with a safer ride.

It is desirable that the alarm control having a loud honk is immediately deactivated as soon as the suspicious character or the like is driven away. In the embodiment, there is no limit in the press mode, including press time period of the alarm switch 4 at the time of deactivation of the alarm control. Therefore, as is apparent from the time chart of FIG. 4, the alarm reversal signal is transmitted once a press of the alarm switch 4 is started, thus deactivating the alarm control on the receiver 11 side. It is therefore possible to suppress a harmful influence on the environment, such as noise caused by the implementation of the alarm control, to the minimum.

Although the explanation of the embodiment is finished here, the aspect of the present invention is not limited to the above embodiment. For instance, although the present invention is embodied in a vehicle alarm system, it is not exclusive to a vehicle, but may be applied to a home security alarm system, and the like. In the case of the home security alarm system, when one comes home and sees a suspicious character near his or her house, the habitant may cause the receiver located in the house to perform the alarm action by operating the transmitter at hand in order to drive the suspicious character away.

In the above embodiment, the same alarm reversal signal is transmitted from the transmitter 1 as an Activate signal and a Deactivate signal of the alarm control, but the signal is not limited to this. For example, when the receiver 11 is so constructed as to activate and deactivate the alarm control according to different signals, different signals corresponding to an Activate signal and a Deactivate signal may be employed. The signal transmitted from the transmitter 1 is not limited to a radio wave signal, but may be a signal using an infrared ray, for example.

Furthermore in the above embodiment, a long press given for one or more seconds is determined as the first operation (first operation mode) in the initial condition. As to the second operation (second operation mode), there is no limitation in the press time period thereof, and the alarm reversal signal is transmitted even in response to a short press. The operation modes, however, are not limited to this. What is important is that the first and second operation modes are differentiated from each other. For example, the second operation may be differentiated from the first by being limited such that the second press time period T-alarm is less than 0.5 second. Moreover, reversely to the above embodiment, the first operation mode and the second may be arranged the other way around.

Although in the above embodiment, the duration of the alarm control implemented by the receiver 11 is determined to be three minutes, the duration is not limited to this. The duration of the alarm control may be determined according to the purpose or conditions of use of the alarm system. In this case, the counting time of the timer of the transmitter 1 has to be set in accordance with the duration of the alarm control.

Additionally in the above embodiment, the alarm switch 4 is used as an operation member, and the operation member is operated by the operator's pressing the alarm switch 4. However, the operation of the operation member is not limited to this. For example, it is possible that a lever switch is utilized as an operation member, and the operator moves the lever switch to operate the operation member. The operation member may be anything as long as the ON/OFF state of the switch can be changed through the operation carried out by the operator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An alarm system that receives, by means of a receiver, an alarm reversal signal from a transmitter in accordance with operation of an operation member, and alternately activates and deactivates an alarm in response to the received alarm reversal signal, comprising:
   a transmission controller disposed on said transmitter side for transmitting a preceding alarm reversal signal to said receiver when said operation member is operated in a first operation mode in an initial condition thereof to activate an alarm and to set an operation mode to a second operation mode, and for transmitting a succeeding alarm reversal signal, identical to the preceding alarm reversal signal, to said receiver when said operation member is operated in said second operation mode before a prescribed time period expires after transmission of said preceding alarm reversal signal to deactivate the alarm and to reset the operating mode to the first operating mode; and
   a reception controller disposed on said receiver side for activating an alarm upon receipt of said preceding alarm reversal signal and for deactivating said alarm upon receipt of said succeeding alarm reversal signal while said alarm is ON.

2. The alarm system according to claim 1, wherein:
said reception controller deactivates said alarm regardless of the presence or absence of said succeeding alarm reversal signal when said prescribed time period expires after the activation of said alarm; and
said transmission controller returns to said initial condition when said prescribed time period expires without said operation member's being operated in said second operation mode after the transmission of said preceding alarm reversal signal.

3. The alarm system according to claim 1, wherein:
said preceding alarm reversal signal is issued and an operation mode is set to said second operation mode only when a user continuously operates the operation member at least for a prescribed operation time, and said succeeding alarm reversal signal is issued and the operation mode is reset to said first operation mode when the user operates said operation member regardless of an operation time of said operation member.

4. The alarm system according to claim 1, wherein:
said alarm system is applied to a vehicle.

5. The alarm system according to claim 4, wherein:
said transmitter is integrally installed in a keyless entry transmitter.

6. The alarm system according to claim 4, wherein:
said receiver implements said alarm by activating a horn of said vehicle.

7. The alarm system according to claim 4, wherein:
said receiver implements said alarm by activating headlights of said vehicle.

8. The alarm system according to claim 1, wherein:
said Activate signal and said Deactivate signal are wireless signals.

9. The alarm system according to claim 8, wherein:
said preceding alarm reversal signal and said succeeding alarm reversal signal are radio wave signals.

10. The alarm system according to claim 8, wherein:
said preceding alarm reversal signal and said succeeding alarm reversal signal are infrared signals.

* * * * *